(12) United States Patent
Baker et al.

(10) Patent No.: US 8,416,943 B2
(45) Date of Patent: Apr. 9, 2013

(54) SYSTEM AND METHOD FOR DISTRIBUTING CUSTOMER CONTACTS

(75) Inventors: Daniel Baker, Rolling Meadows, IL (US); Anthony J. Dezonno, Bloomingdale, IL (US); Craig R. Shambaugh, Wheaton, IL (US)

(73) Assignee: Aspect Software, Inc., Chelmsford, MA (US)

( * ) Notice: Subject to any disclaimer, the term of this patent is extended or adjusted under 35 U.S.C. 154(b) by 1394 days.

(21) Appl. No.: 09/918,902

(22) Filed: Jul. 31, 2001

(65) Prior Publication Data

US 2003/0026414 A1 Feb. 6, 2003

(51) Int. Cl.
*H04M 3/00* (2006.01)

(52) U.S. Cl.
USPC .............................. 379/265.09; 379/265.01

(58) Field of Classification Search ............. 379/265.09, 379/265.12, 265.13, 266.02, 266.01, 265.01
See application file for complete search history.

(56) References Cited

U.S. PATENT DOCUMENTS

| | | | |
|---|---|---|---|
| 4,881,261 A | 11/1989 | Oliphant et al. ............... 379/215 |
| 5,341,412 A | 8/1994 | Ramot et al. ..................... 379/92 |
| 5,546,456 A | 8/1996 | Vilsoet et al. .................. 379/265 |
| 5,555,179 A | 9/1996 | Koyama et al. | |
| 5,765,033 A | 6/1998 | Miloslavsky | |
| 5,822,400 A | 10/1998 | Smith ............................. 379/34 |
| 5,828,839 A | 10/1998 | Moncreiff ................ 395/200.34 |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,128,646 A | 10/2000 | Miloslavsky .................. 709/206 |
| 6,130,933 A | 10/2000 | Miloslavsky .............. 379/90.01 |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,198,814 B1 | 3/2001 | Gill ............................... 379/266 |
| 6,212,178 B1 | 4/2001 | Beck et al. ..................... 370/352 |

(Continued)

FOREIGN PATENT DOCUMENTS

WO    WO 02/065741    8/2002

*Primary Examiner* — Rasha Al Aubaidi
(74) *Attorney, Agent, or Firm* — Husch Blackwell LLP

(57) ABSTRACT

Disclosed is a method for distributing customer contacts to a transaction processing entity of a transaction processing system. The method includes determining a media type for a customer contact in the transaction processing system and finding a transaction processing entity that is capable of handling the media type. In addition, the method includes routing the customer contact to a transaction processing entity that is capable of handling the media type. In one embodiment, a transaction routing table is used to perform the distribution of customer contacts. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

31 Claims, 2 Drawing Sheets

U.S. PATENT DOCUMENTS

| | | | |
|---|---|---|---|
| 6,230,197 B1 | 5/2001 | Beck et al. ................... 709/223 |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,389,132 B1 * | 5/2002 | Price ....................... 379/265.01 |
| 6,393,015 B1 | 5/2002 | Shtivelman |
| 6,665,359 B1 * | 12/2003 | Flake ........................... 375/354 |
| 6,732,156 B2 | 5/2004 | Miloslavsky |
| 6,771,765 B1 * | 8/2004 | Crowther et al. ........ 379/265.09 |
| 6,832,203 B1 * | 12/2004 | Villena et al. .................... 705/8 |
| 7,092,509 B1 * | 8/2006 | Mears et al. ............. 379/266.01 |
| 2005/0100159 A1 * | 5/2005 | Fink et al. ............... 379/265.11 |

* cited by examiner

| Calls/Skill | Voice | Voicemail | Chat | Email | Webcast |
|---|---|---|---|---|---|
| Tony | 1/1 | 15/100 | 1/10 | 20/100 | 0/1 |
| Jane | 0/1 | 0/100 | 0/10 | 100/100 | 0/1 |
| Bill | 1/1 | 36/100 | 0/10 | 10/100 | 0/1 |
| Sue | 0/1 | 1/50 | 0/1 | 10/50 | 1/1 |
| John | 1/1 | 1/100 | 0/1 | 4/100 | 0/1 |
| Mary | 1/1 | 5/100 | 0/0 | 10/50 | 0/0 |

Transaction Routing Table

FIG. 2

SYSTEM AND METHOD FOR DISTRIBUTING CUSTOMER CONTACTS

BACKGROUND OF THE INVENTION

This invention relates generally to communication systems, more particularly, to transaction processing systems.

Communications systems with customer contact centers are known. Such systems are typically used as a means of distributing customer contacts, such as telephone calls, among a group of agents of an organization. As customer contacts are directed to the organization from a communications network, such as a public switch telephone network (PSTN), the communications system directs the customer contacts to its agents based upon some algorithm. For example, a communications system such as an automatic call distributor (ACD), a private branch exchange (PBX), or a central office exchange service (Centrex) may recognize a call target based upon an identity of an incoming trunk line and route the call accordingly.

Businesses, service organizations, and other entities may use customer contact centers to handle the daily influx of telephone calls, email messages and voice mail contacts for marketing, sales, product support, and other customer service functions. Agents of the communications system may provide product support, take sales orders, and handle inquiries. In essence, the agents provide the wide array of services that the companies that use them require. Thus, the effectiveness and efficiency of a communications system may depend on the performance of the agents.

However, the present format is limited. Currently, an unlimited number of customer contacts may be delivered to any one agent. For example, an agent may be handling a telephone call and simultaneously "chatting" with an Internet customer. In such a situation, the agent may not be able to handle another customer contact, however, another customer contact may be sent to the agent. Sending too many customer contacts to any one agent may degrade the quality and effectiveness of the communications system. Accordingly, a need exists for a system and method for routing transaction types.

SUMMARY

Under one embodiment of the invention, disclosed is a method for distributing customer contacts to a transaction processing entity of a transaction processing system. The method includes determining a media type for a customer contact in the transaction processing system and finding a transaction processing entity that is capable of handling the media type. In addition, the method includes routing the customer contact to a transaction processing entity that is capable of handling the media type. In yet another embodiment, a transaction routing table is used to perform the distribution of customer contacts.

Other embodiments, features, and advantages of the invention will be apparent to one with skill in the art upon examination of the following figures and detailed description. It is intended that all such additional embodiments, features, and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 2 illustrates a table that may be used by the system of FIG. 1.

DETAILED DESCRIPTION

Figure 1:
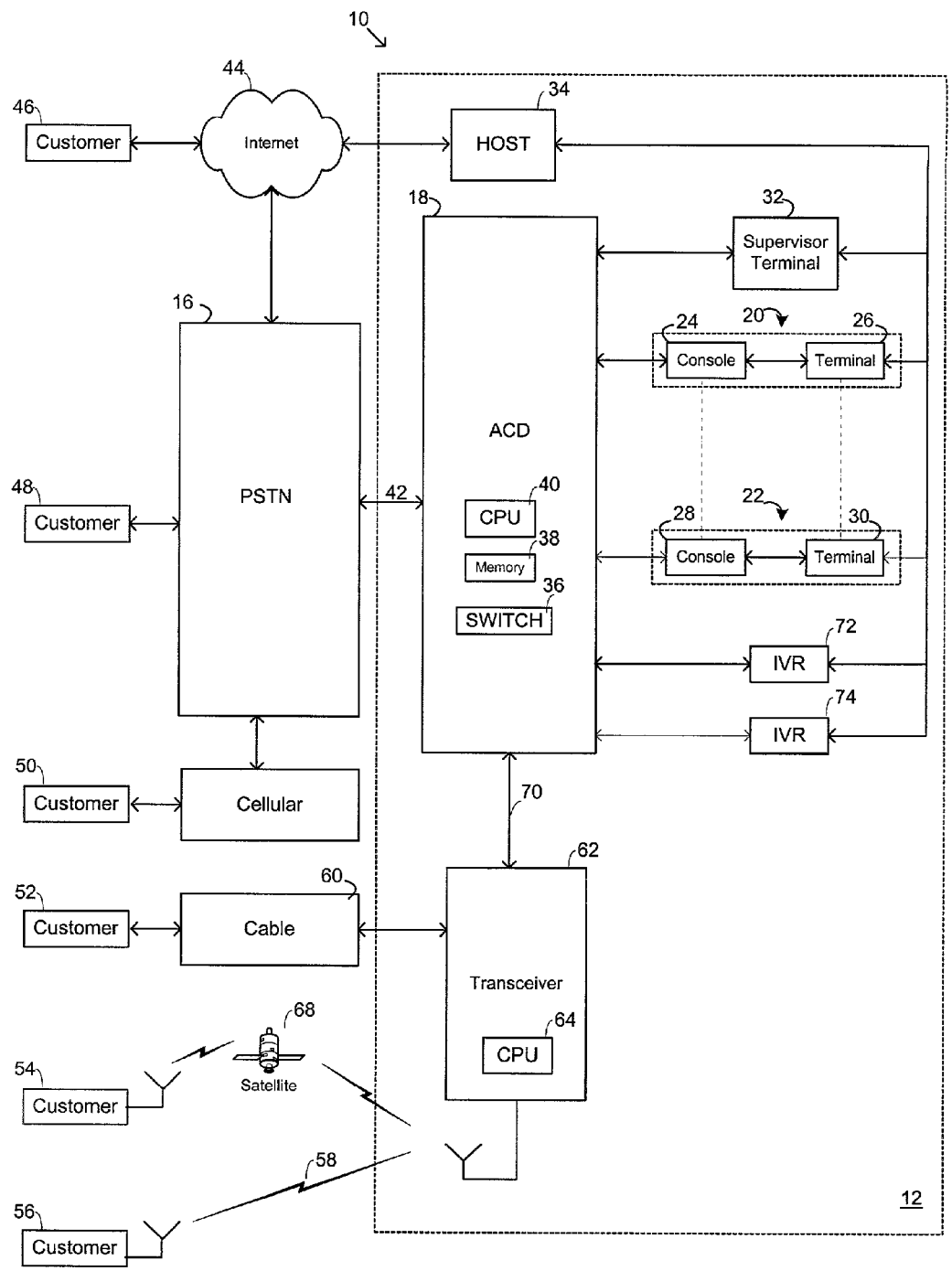
FIG. 1 illustrates a block diagram of a transaction processing system in accordance with an embodiment of the invention.

FIG. 1 depicts a block diagram of an exemplary embodiment of a transaction processing system 10 which may be used to route customer contacts across multiple access channels to a customer contact center 12. The customer contact center 12 may be defined as a communication technology that enables customers and agents of an enterprise to communicate across multiple access channels, including but not limited to telephone, Internet, radio, cellular, satellite, cable, facsimile, email, web and video. As shown in FIG. 1, the customer contact center 12 may be described with reference to an automatic call distributor (ACD) 18. As is known in the art, a PBX, Centrex system or other system capable of incoming and/or outgoing communications may also be used in place of the ACD 18. Implementing a customer contact center 12 with any suitable switching system is considered to be equivalent and variations will not be further discussed. In addition, the customer contact center 12 is also often identified by other terms including call center, connected call center, customer care center, customer communications center and services center.

As used herein, a customer contact may be based on any suitable communications connection including, but not limited to, a switched circuit connection (i.e., through the PSTN) or a packet connection (e.g., through the Internet). A switched circuit connection (also sometimes referred to simply as a "telephone connection" in the telephony arts) refers to a dedicated channel existing between two parties. As used herein, a packet connection does not necessarily represent a physical connection, but may simply be the possession and concurrent use by two users of the other user's identifier (e.g. IP address).

In the illustrated embodiment, customer contacts may be received from customers 46, 48, 50, 52, 54, 56 and may be routed to a selected transaction processing entity (e.g., agent stations 20, 22 or interactive voice response units (WRs) 72, 74) of the transaction processing system 10. For example, each agent station 20, 22 may include a telephone console 24, 28 and a terminal 26, 30. Switched circuit customer contacts with customers 48, 50, 52, 54, 56 placed through the ACD 18, may be routed by matrix switch 36 of the ACD 18 to a console 24, 28 of the agent station 20, 22 or to an appropriate IVR 72, 74. Customer contacts through the Internet 44 may occur as any Internet communications including email, chat sessions, file transfers, and teleconferences. Further, the customer contacts may process voice over IP (VOIP). In any case, a host 34 may route the customer contact to a terminal 26, 30 of an agent station 20, 22 or to an appropriate IVR 72, 74. As shown in the art, the host 34 and ACD 18 functionality may also be controlled by the same processor.

The customer may, for example, use a conventional telephone or cell phone and/or a computer to place/receive a contact with the transaction processing system 10. Alternatively, the customer 52 may place/receive a contact using an interactive channel of a community antenna television (CATV) system 60, land mobile radio 56 or a transmission channel of a satellite 68. Where the customer 52, 54, 56 places a customer contact using an interactive channel of a community antenna television (CATV) system 60, a land mobile radio 56 or a transmission channel of a satellite 68, often such a customer contact is initiated by the entry of a target identifier (e.g., a telephone number of the ACD 18).

Regardless of how a customer contact is processed by the transaction processing system 10, each customer contact is characterized by a media type. As used herein, media type refers to information that describes the customer contact (e.g. the source or access channel of the customer contact). In an illustrative example, media types include video, email, voice, voicemail, webcast and chat. The media type may also include proprietary versions of the aforementioned media types, such as NetMeeting (by Microsoft, Inc.), ICQ and IRC. In addition, media type may include facsimile. Accordingly, the term "media type" is used in this description and in the appended claims to encompass all variations of media type. Further, the various embodiments and implements thereof to form communication between a customer 46, 48, 50, 52, 54, 56 and an agent station 20, 22 of a customer contact center 12 are known in the communications art and will not be further described herein.

For simplicity, reference to an agent herein shall be to the agent station 20, 22 without regard to the device 24, 26, 28, 30 actually used by the agent. Further, the agent station 20, 22 may be equipped with necessary hardware and software to interface with the delivered customer contact. Similarly, reference to a customer herein shall be to a station 46, 48, 50, 52, 54, 56 of the customer without regard to the device actually used.

While the transaction processing system 10 has been described with reference to customer contacts initiated by the customer 46, 48, 50, 52, 54, 56, it should be understood that customer contacts may just as well be initiated by the transaction processing system 10. For example, customer lists may be maintained in a database of the host 34. The CPU 40 of the system 10 may initiate outgoing customer contacts to the customers 46, 48, 50, 52, 54, 56. The customer contacts may be placed through the PSTN 16, radio frequency (RF) transceiver 62 or by the host 34 through the Internet 44. In one embodiment, associated with each customer 46, 48, 50, 52, 54, 56 may be an identifier and routing information. The identifier may be an identifier used for identifying the customer 46, 48, 50, 52, 54, 56 within a particular communication system (e.g., a telephone number within the PSTN 16, an IP address within the Internet 44, a customer account number within the CATV system 60, an electronic serial number (ESN) within the land mobile radio 56 or satellite system 56, etc.).

In addition, the routing information may be used to identify the particular system (e.g. PSTN 16, Internet 44, CATV 60, land mobile radio 56, satellite 68, etc.) within which the identifier is to be used. In the case of the transaction processing system 10, the routing information may be in one embodiment simply identify the port through which the customer contact is to be processed. For example, a port for an Internet customer contact may be an Internet connection with the host 34. A telephone customer contact may be processed through a first set of trunk connections 42 using a respective port of a switch 36 of the ACD 18. A customer contact with a cable subscriber 52, land mobile user 56 or satellite customer 54 may be processed through a second set of trunk connections 70 using a respective port of the switch 36 of the ACD 18. The identifier and routing information may, together, be referred to herein as customer contact associated information. By using the customer contact associated information, the system 10 may initiate outgoing customer contacts to the customers 46, 48, 50, 52, 54, 56. The bi-directional nature of transaction processing of customer contacts in some embodiments may be reflected by using the phrase "customer contacts with customers 46, 48, 50, 52, 54, 56".

Whether a customer contact is incoming or outgoing, the distribution of the customer contact to transaction processing entities 20, 22, 72, 74 may be substantially the same. When the customer contact is outgoing, the transaction processing system 10 inherently knows the media type of the customer contact and the identity of the customer target. When the customer contact is incoming, the transaction processing system 10 may determine the media type and the identity of the customer contact based upon the customer contact associated information (e.g., a port number and ANI or IP address information in the case of the PSTN or Internet). By knowing the incoming media type, the transaction processing system 10 may route the customer contact based upon an understanding of capabilities of the transaction processing entities 20, 22, 72, 74 or some other well-known criteria.

Customer contacts with customers 46, 48, 50, 52, 54, 56 may be routed to transaction processing entities (e.g. agent stations 20, 22) based upon one of two formats. Under a first format, a customer contact may be detected by the ACD 18 as a switched circuit format formed through the PSTN 16. Customer contacts received under the first format are typically delivered along with customer contact associated information (e.g., DNIS, ANI, ESN, switch port number, etc.). Customer contact associated information may be used by a CPU 40 as a means of routing the customer contact. Customer contacts under this first type may be routed based upon any of a number of predetermined criteria (e.g., the number called, the identity of the caller, the locale of the caller, the time of day, etc.).

Customer contacts with customers 46 under the second format occur through the Internet. As with switched circuit customer contacts, the host 34 may inherently know the identity of outgoing customer contacts. Since the host 34 would know the identity of outgoing customer contacts, the host 34 can easily route the customer contact based upon customer records. Incoming customer contacts through the Internet may also be routed by the host 34 based upon customer contact associated information (i.e., the IP address of the customer 46). If the customer 46 is an existing customer, the host 34 can identify the customer in its database using the IP address of the customer contact as a search term. As above, historical records of the customer may be used as a basis for routing the customer contact. If the customer contact 46 is not an existing customer, then the host 34 may route the customer contact 46 based upon the context (e.g., an identity of a website visited, a webpage from which a query originates, an identity of the e-mail address within the system 10 which receives a query, etc.).

Because Internet customer contacts and PSTN customer contacts may be distributed to a common set of transaction processing entities 20, 22, 72, 74, the CPU 40 and host 34 may coordinate their efforts in distributing customer contacts. When an Internet customer contact is received, the host 34 may consult an internal table of transactions and agents or retrieve a table from the CPU 40 of the ACD 18. From that table, the host 34 may select the most qualified agent for assignment of the customer contact. Upon selection of the agent, the host 34 routes the customer contact to the selected agent station 20, 22. When the host 34 assigns a customer contact, the host 34 sends notification to the CPU 40 of the ACD 18. Notification of a customer contact assignment by the host 34 causes the CPU 40 to update its table of transactions and agents. Similarly, when the CPU 40 assigns a customer contact, the CPU 40 may send notification to the host 34.

Using this method, the CPU 40 and host 34 may each maintain a table of transactions and agents.

Customer contact delivery to a transaction processing entity 20, 22, 72, 74 may be accomplished under several formats. For example, where the customer contact is of a switched circuit format, the CPU 40 selects a transaction processing entity 20, 22, 72, 74 and delivers the customer contact to the console 24, 26 of the selected agent 20, 22 or to the selected IVR 72, 74. The CPU 40 may send a customer contact delivery message including the customer contact associated information to the host 34. Where the host 34 is able to identify customer records, the host 34 may present those records to the selected customer contact processing entity 20, 22 at the instant of delivery (e.g., as a screen pop on a terminal 26, 30 of the selected agent).

Where a customer contact is through the Internet, presentation may in one embodiment be entirely through the terminal 26, 30 of the selected agent. Email messages may be forwarded in their entirety to the selected agent. Where the customer contact is in the form of a web telephony session, the host 34 may, for example, forward the IP address of the requestor to the selected agent. Where the host 34 is able to identify customer records, those records may be presented to the agent along with the email, web telephony request or Internet query.

In one embodiment, a threshold value may be used in conjunction with any media type as a basis for routing customer contacts. Selection of an agent for a customer contact may be made based upon an understanding of other customer contacts that are assigned to each agent. Each agent may have a maximum number of customer contacts that he or she may handle. For example, agent stations 20, 22 may not be able to handle more than 100 emails in a timely fashion and therefore the transaction processing system may not assign more than 100 emails to either of the agent stations 20, 22. Further, certain media types require the agents fall attention and therefore, the agent may not be able to service other customer contacts. For example, if agent station 20 is servicing a voice customer contact then the agent station 20 may not also be involved with an Internet webcast. In an illustrative embodiment, the transaction processing system 10 categorizes media types as exclusive and nonexclusive. As used herein, exclusive may mean that the agents full attention is required and the agent may not receive new customer contacts while servicing the current media type. For example, exclusive media types include voice, video and webcast. As used herein, all other media types are defined as nonexclusive. In an alternative embodiment, the transaction processing system 10 may specify a range of priorities for each media type (e.g., high, medium and low priority). For example, customer contacts with high priority are processed before those with a lower priority.

In an illustrative embodiment, the transaction processing center 10 checks a transaction routing table to determine whether a customer contact may be routed to a selected agent. In general, a supervisor working through a supervisors terminal 32 may evaluate a skill of each agent 20, 22. The skill evaluated by the supervisor may be against a number of different criteria. More specifically, the supervisor may enter a skill for each agent 20, 22 with regard to each media type. For example, the agent 20 may be able to handle up to 100 emails while the agent 22 may only be able to handle up to 50 emails. The supervisor may evaluate the skill of each agent based upon the length of time that the agent has been working in the call center 12 or the agent's knowledge. Further, agents may become available to accept calls in any of a number of ways.

In some embodiments, a supervisor may utilize a force management package to determine an overall number of agents required by the ACD 18. Once a number is determined, the supervisor may specify the specific agents needed for customer contacts based upon his own personal knowledge or upon a skill mix provided by the force management package. Using the workforce management package, the supervisor may come to an understanding of agent skills and be able to create a transaction routing table listing the maximum number of customer contacts that each agent may service. For example, shown in FIG. 2 is an example transaction routing table where the denominator in each cell describes a threshold for the maximum number of customer contacts that each agent may service for each media type and the numerator in each cell describes a metric for the number of assigned customer contacts. For example, as shown in FIG. 2, Jane's threshold for email customer contacts is 100 emails and she is currently assigned to 100 emails (line #2). Further, Sue (line #4) may only service 50 emails since the supervisor may have ascertained that Sue's skill level requires a threshold of 50 emails.

Calls may be routed to an agent by determining whether the agent is capable of handling the media type of the customer contact. One factor for determining whether the agent is capable of handling the media type is to determine whether the media type is exclusive. For example, Tony in line #1 is handling a voice customer contact and a voice media type is exclusive; thus, Tony should not be assigned another exclusive customer contact (e.g., voice, video or webcast). Note that the denominator for those media types have the number "1" that denotes that the media type is exclusive. As long as Tony is servicing the voice customer contact, the transaction processing system may not require Tony to handle another voice, video, or webcast customer contact.

In an illustrative embodiment, the transaction processing system 10 determines whether an agent is capable of handling a customer contact by referring to a transaction routing table. For instance, before an exclusive customer contact is routed to an agent, the transaction processing system determines whether the selected agent is already handling another exclusive customer contact. If the agent is already assigned to an exclusive customer contact, then the transaction processing system selects another entry in the routing table to find an agent capable of handling the exclusive customer contact. In yet another instance, before an agent is routed a webcast, the transaction processing system may determine whether the agent's terminal is capable of handling the webcast customer contact by referring to the threshold for webcast customer contacts. For example, Mary is not able to handle Internet-based customer contacts as the threshold for chat and webcast customer contacts is set to zero (line #6). In yet another instance, before an agent is routed an email, the transaction processing system may determine whether the agent's threshold for email has been met. In like fashion, the transaction processing system 10 refers to a transaction routing table before routing customer contacts to transaction processing entities in the system 10.

While various embodiments of the invention have been described, it will be apparent to those of ordinary skill in the art that many more embodiments and implementations are possible that are within the scope of this invention.

What is claimed is:

1. A method for distributing customer contacts to a selected one of a plurality of transaction processing entities each capable of handling a plurality of media types in a transaction processing system, such method comprising:

determining a media type for a customer contact in the transaction processing system, the media type determined by the access channel of the customer contact;

identifying the media type as exclusive or nonexclusive;

finding a transaction processing entity that is capable of handling the media type;

establishing a table of a predetermined maximum number of customer contacts of each media type that may be simultaneously handled by each transaction processing entity, and of current customer contact assignments to each transaction entity for each media type;

routing the customer contact to a transaction processing entity that is capable of handling the media type as a current customer contact if the contact will not exceed the maximum number of media type that the transaction processing entity may handle, and permitting no further customer contacts for the duration of said current customer contact by said transaction processing entity when said media type is exclusive while routing other nonexclusive customer contacts to the transaction processing entity during the current customer contact.

2. The method of claim 1 wherein determining a media type further comprises determining a source of the customer contact.

3. The method of claim 2 wherein the source is an access channel comprising at least one of a telephone, Internet, radio, cellular, satellite, cable, facsimile, email, web and video.

4. The method of claim 1 wherein the media type further comprises a priority level specifying the order in which the customer contacts are to be processed by the transaction processing entity.

5. The method of claim 1 wherein the transaction processing entity comprises at least one of an agent, an agent station, a console, a terminal, and an interactive voice response unit.

6. The method of claim 1 wherein finding a transaction processing entity further comprises:

finding a transaction processing entity that is not handling an exclusive media type;

determining a metric of how many customer contacts of non-exclusive media type have been assigned to the transaction processing entity; and comparing the metric to a threshold relating to a maximum number of customer contacts of the media type that the transaction processing entity may handle, and when the metric exceeds the threshold, preferentially routing customer contacts to another transaction processing entity.

7. The method of claim 6 wherein finding a transaction processing entity further comprises searching a transaction routing table for a transaction processing entity that is processing a nonexclusive media type.

8. The method of claim 1 further comprising using a transaction routing table to list assigned customer contacts to transaction processing entities.

9. The method of claim 8 wherein the transaction routing table is updated once a customer contact has been routed to the transaction processing entity that is capable of handling the media type.

10. The method of claim 1 wherein routing the customer contact further comprises connecting the customer contact to the transaction processing entity that is capable of handling the media type.

11. The method of claim 10 wherein connecting is performed by a matrix switch of an automatic call distributor.

12. A method for distributing customer contacts to a selected one of a plurality of transaction processing entities each capable of handling a plurality of media types in a transaction processing system, such method comprising:

determining a media type for a customer contact in the transaction processing system, the media type determined by the access channel of the customer contact;

identifying the media type as exclusive or nonexclusive;

preparing a transaction routing table of transaction processing entities based on media types including whether the media types are exclusive or nonexclusive, a maximum number of customer contacts of each media type that each transaction processing entity may handle simultaneously;

searching the transaction routing table for a transaction processing entity that is capable of handling the media type;

determining a metric of how many customer contacts of the media type have been assigned to the transaction processing entity; and comparing the metric to the maximum number of customer contacts of the media type that the transaction processing entity may handle simultaneously, and when the metric exceeds the threshold, preferentially routing other customer contacts to other transaction processing entities; and routing the customer contact to the transaction processing entity that is capable of handling the media type as a current customer contact and permitting no further customer contact of the exclusive media type for the duration of the current customer contact while routing other non-exclusive customer contact so long as the metric does not exceed the threshold.

13. The method of claim 12 wherein the capable transaction processing entity comprises an agent station that is equipped with the necessary hardware to handle the media type.

14. The method of claim 13 wherein necessary hardware comprises interfaces to a Internet, cable television, radio, satellite, and a telephone system.

15. The method of claim 12 wherein determining a media type further comprises determining a source of the customer contact.

16. The method of claim 15 wherein the source is an access channel comprising at least one of a telephone, Internet, radio, cellular, satellite, cable, facsimile, email, web and video.

17. The method of claim 12 wherein the transaction processing entity comprises at least one of an agent, an agent station, a console, a terminal, and an interactive voice response unit.

18. The method of claim 12 further comprising using the transaction routing table to list assigned customer contacts to transaction processing entities and to list a maximum number of customer contacts of each media type permitted for each transaction processing entity.

19. The method of claim 18 wherein the transaction routing table is updated once a customer contact has been routed to the transaction processing entity that is capable of handling the media type.

20. A method for distributing customer contacts to a selected one of a plurality of transaction processing entities each capable of handling a plurality of media types in a transaction processing system, such method comprising:

determining a media type for a customer contact in the transaction processing system, the media type determined by the access channel of the customer contact;

identifying the media type as exclusive or nonexclusive;

preparing a transaction routing table of transaction processing entities based on media types including current processing assignments for each transaction processing entity, and a maximum number of assignments of each transaction type that each entity may simultaneously handle;

searching the transaction routing table for a transaction processing entity that is processing a nonexclusive media type;

searching the transaction routing table for a transaction processing entity that is capable of handling the media type;

determining a metric of how many customer contacts of the media type have been assigned to the transaction processing entity;

comparing the metric to a threshold relating to a maximum number of customer contacts of the media type that the transaction processing entity may handle, and when the metric exceeds the threshold, preferentially routing other customer contacts to other transaction processing entities; and when the media type is nonexclusive and the metric does not exceed the threshold, routing the customer contact to the transaction processing entity handling a media type that is capable of handling the media type;

when the media type is exclusive and the metric does not exceed the threshold, routing the customer contact to the transaction processing entity, when the transaction processing entity is not currently handling another exclusive media type customer contact.

21. A system for distributing customer contacts to a selected one of a plurality of transaction processing entities each capable of handling a plurality of media types in a transaction processing system comprising:

means for determining a media type for a customer contact in the transaction processing system, the media type determined by the access channel of the customer contact;

means for identifying a media type as exclusive or nonexclusive;

means for finding a transaction processing entity that is capable of handling the media type;

means for determining a metric of how many customer contacts of the media type have been assigned to the transaction processing entity; and means for comparing the metric to a threshold relating to a maximum number of customer contacts of the media type that the transaction processing entity may handle simultaneously, and when the metric exceeds the threshold, preferentially routing other customer contacts to another transaction processing entity;

means for routing the customer contact to a transaction processing entity that is capable of handling the media type as a current customer contact so long as the metric does not exceed the threshold; and means for permitting no further customer contacts of exclusive media type while the transaction processing entity is servicing said current customer contact when said current customer media type is exclusive while permitting further contacts of nonexclusive media type during said exclusive current customer contact.

22. The system of claim 21 wherein the means for determining a media type further comprises means for determining a source of the customer contact.

23. The system of claim 22 wherein the source is an access channel comprising at least one of a telephone, Internet, radio, cellular, satellite, cable, facsimile, email, web and video.

24. The system of claim 21 wherein the media type further comprises a priority level specifying the order in which the customer contacts are to be processed by the transaction processing entity.

25. The system of claim 21 wherein the transaction processing entity comprises at least one of an agent, an agent station, a console, a terminal, and an interactive voice response unit.

26. The system of claim 21, wherein the means for finding a transaction processing entity further comprises:

means for finding a transaction processing entity that is not handling an exclusive media type;

means for determining a metric of how many customer contacts of the media type have been assigned to the transaction processing entity; and means for comparing the metric to a threshold relating to the maximum number of customer contacts of the media type that the transaction processing entity may handle, and when the metric exceeds the threshold, preferentially routing customer contacts to another transaction processing entity.

27. The system of claim 26 wherein the means for finding a transaction processing entity further comprises means for searching a transaction routing table for a transaction processing entity that is processing a nonexclusive media type.

28. The system of claim 21 further comprising a transaction routing table to list assigned customer contacts to transaction processing entities.

29. The system of claim 28 further comprising means for updating the transaction routing table once a customer contact has been routed to the transaction entity that is capable of handling the media type.

30. The system of claim 21 further comprising means for connecting the customer contact to the transaction processing entity that is capable of handling the media type.

31. The system of claim 30 wherein the means for connecting comprises a matrix switch of an automatic call distributor.

* * * * *